United States Patent [19]

Kozaki et al.

[11] Patent Number: 4,552,436

[45] Date of Patent: Nov. 12, 1985

[54] LIQUID CRYSTAL DISPLAY HAVING UNIFORM TRANSMITTANCE

[75] Inventors: Shuichi Kozaki; Yutaka Ishii; Fumiaki Funada, all of Nara, Japan

[73] Assignee: Sharp Kabushiki Kaisha, Osaka, Japan

[21] Appl. No.: 517,452

[22] Filed: Jul. 26, 1983

[30] Foreign Application Priority Data

Jul. 28, 1982 [JP] Japan ................................ 57-132878

[51] Int. Cl.[4] .............................................. G02F 1/13
[52] U.S. Cl. .................................. 350/337; 350/347 R
[58] Field of Search ............... 350/337, 347 E, 347 R, 350/347 V

[56] References Cited

U.S. PATENT DOCUMENTS 4,418,987  12/1983  Takanashi et al. .................. 350/337
4,426,133   1/1984  Funada et al. ................... 350/337 X
4,443,065   4/1984  Funada et al. ............... 350/347 R X

FOREIGN PATENT DOCUMENTS 52-49854  4/1977  Japan ................................. 350/337

Primary Examiner—John K. Corbin
Assistant Examiner—Richard F. Gallivan
Attorney, Agent, or Firm—Staas & Halsey

[57] ABSTRACT

A liquid crystal display having a uniform transmittance in the visible light range. The display includes a polarizer and analyzer which correct a non-uniform light transmittance of a liquid crystal layer. This is accomplished by controlling an angle between polarization axes of the polarizer and the analyzer in dependence on the product of a refractive index anisotropy and a thickness of the liquid crystal layer, so that the combined transmittance of the polarizer and the analyzer is a maximum in the wavelength range from 400 nm to 500 nm. When the product is approximately 0.5 $\mu$m, the angle is selected in the range from 92 to 110 degrees and when the product is approximately 1.0 $\mu$m, the angle is selected in the range from 94 to 120 degrees.

7 Claims, 10 Drawing Figures

LIQUID CRYSTAL DISPLAY HAVING UNIFORM TRANSMITTANCE

BACKGROUND OF THE INVENTION

1. Field of the Invention

The present invention relates to a liquid crystal display of the TN-FEM (twisted-nematic field-effect) type having liquid crystal molecules with a 90° twist, in which a polarizer and an analyzer are given particular spectral characteristics by setting their polarization axes at a certain angle $\theta$ to improve the appearance of displayed images on the TN-FEM liquid crystal display especially when an electric field is not applied to the display.

2. Description of the Prior Art

FIG. 1($a$) is a cross-sectional view of a conventional TN-FEM type liquid crystal cell and FIG. 1($b$) is a diagram showing polarization axes and of a polarizer and an analyzer, respectively. A liquid crystal cell is positioned between the polarizer 1 (FIG. 1($a$)) and the analyzer 7. The liquid crystal cell comprises two glass substrates 2, 2', two transparent electrodes (ITO electrodes) 3, and two insulating films 4 for orienting liquid crystal molecules. The electrodes 3 and the films 4 are positioned between the inner surfaces of the substrates, and a liquid crystal layer 5 of a twisted-nematic structure is inserted between the insulating films 4. The glass substrates 2 and 2' are sealed around their peripheral edges by a spacer 6. The liquid crystal molecules closer to the glass substrate 2 are oriented in the direction of a vector $r_1$ (FIG. 1($b$)), while the liquid crystal molecules closer to the glass substrate 2' are oriented in the direction of a vector $r_2$. The polarizer 1 has a direction of polarization expressed by vector P, and the analyzer 7 has a direction of polarization expressed by vector A, these directions of polarization being shown in FIG. 1($b$) as viewed from immediately above the liquid crystal cell. $\theta$ is designated as the angle formed between the polarizer 1 and the analyzer 7, and $\beta$ as the angle of twist (=90°) of the liquid crystal molecules. In FIG. 1($b$), the difference angle $\Delta\theta = (\theta - \beta)/2$.

FIG. 2 illustrates the general spectral characteristics of light transmitted through the liquid crystal cell shown in FIG. 1($a$) when no electric field is applied. The spectral characteristics of the transmitted light are dependent on the anisotrophy $\Delta n$ of the refractive index of the light crystal ($\Delta n = n_3 - n_o$ where $n_3$ = refractive index of extraordinary ray $n_o$ = refractive index of ordinary ray), the thickness d of the liquid crystal layer, the spectral characteristics of the polarizer and the analyser, and the angle $\theta$ formed between the polarization axes of the polarizer and the analyzer.

Recently, liquid crystal displays have been constructed such that the anisotropy $\Delta n$ of refractive index of the liquid crystal and the thickness d of the liquid crystal layer are very small in order to improve the viewing angle of the display. As a result, the optical distance $\Delta n \cdot d$ is so small that it is comparative to the wavelengths of visible light rays, thereby causing a strong interference phenomenon. This causes the spectral characteristics of the light transmitted through the TN-FEM type liquid crystal cell to vary greatly in the visible light range, resulting in a coloration or discoloration of the liquid crystal cell. Consequently, the display quality attained by the liquid crystal display is very impaired. This coloring phenomenon is highly dependent on the thickness d of the liquid crystal cell. Since in a liquid crystal cell having a relatively large display area it is difficult to control a uniform cell thickness, the liquid crystal cell is subjected to varying colorations in the area and has a poor display quality.

SUMMARY OF THE INVENTION

It is an object of the present invention to eliminate the foregoing shortcomings and to select spectral characteristics of a polarizer or an analyzer or a combination of the polarizer and the analyzer in order to remove any coloring phenomenon of a liquid crystal cell or to enable a liquid crystal display to give display in a hue of high quality.

A liquid crystal dispaly is provided including a liquid crystal layer of twisted nematic structure interposed between a polarizer and an analyzer. The polarizer and analyzer have spectral characteristics selected such that light transmittance is maximum in the wavelength range of from 400 nm to 500 nm. The liquid crystal layer has an anisotropy $\Delta n$ of refractive index and a thickness d. The polarizer and analyzer have poralization axes forming an angle $\theta$ therebetween, where the angle $\theta$ selected is in the range of from 91° to 110° when the product $\Delta n \cdot d$ is approximately 0.5 $\mu$m and in the range of from 94° to 120° when the product $\Delta n \cdot d$ is approximately 1.0 $\mu$m.

BRIEF DESCRIPTION OF THE DRAWINGS

FIG. 1($b$) is a graph showing the polarization axes of a polarizer and analyzer;

DETAILED DESCRIPTION OF THE PREFERRED EMBODIMENTS

Figure 2:
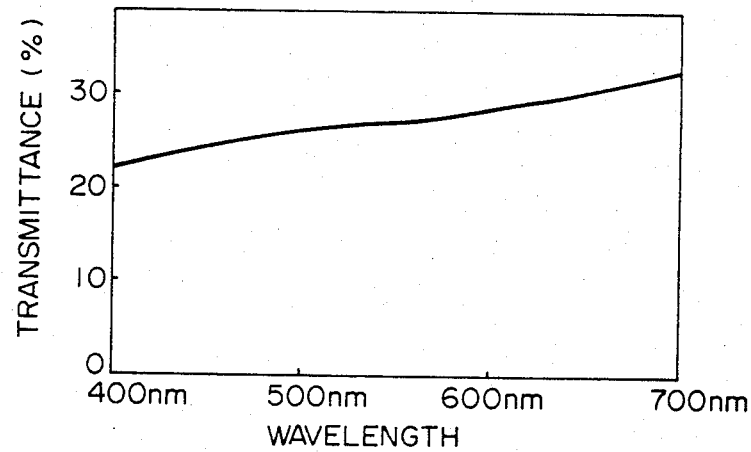
FIG. 2 is a graph of spectral characteristics of light transmitted through the liquid crystal cell of FIG. 1($a$)
Figure 3:
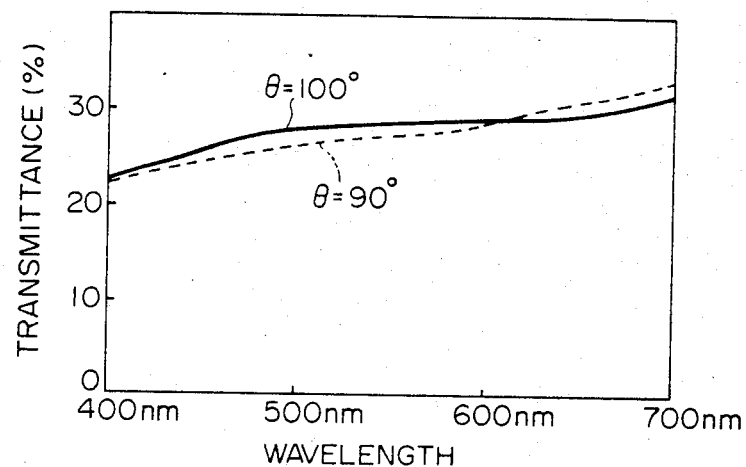
FIG. 3 is a graph of spectral characteristics of light transmitted through the liquid crystal cell of FIG. 1($a$) obtained with different angles between polarization axes.

The spectral characteristics of the light transmitted through a conventional liquid crystal display as shown in FIG. 2, exhibit a transmittance which is higher with longer wavelengths in the visible light range and lower with shorter wavelengths. The hue of the liquid crystal display is reddish and the display quality is poor. To remove the reddish hue, the spectral characteristics of a polarizer or an analyzer are selected such that the transmittance is a maximum in the vicinity of wavelengths ranging from 400 nm to 500 nm. Where the product of the anisotropy $\Delta n$ of the refractive index of the liquid crystal and the thickness d of the liquid crystal layer (that is, the optical distance) is 0.5 $\mu$m, the angle $\theta$ between the polarization axes of the polarizer and the analyzer is selected in the range of from 90° to 105°, and where the product $\Delta n \cdot d$ is 1.0 $\mu$m, the angle $\theta$ is selected in the range of from 94° to 110°. This increases the transmittance for the light transmitted throught the liquid crystal cell at shorter wavelenths in the visible light range, so that the spectral characteristics of the liquid crystal cell will be rendered flat throughout the full range of visible light rays. Accordingly, the liquid crystal cell is white in color, and the display quality of the liquid crystal display is highly improved. Moreover, we confirmed that these setting angles have also effects on improving the contrast ratio and the viewing angles of liquid crystal display. FIG. 3 shows the spectral characteristics obtained when the angle $\theta$ between the polarization axes is selected to be 90° and 100°. The present invention has been arranged on the results of such experiments.

Examples of the preferred embodiments of the present invention will be described with reference to the drawings.

EXAMPLE 1

Figure 1A:
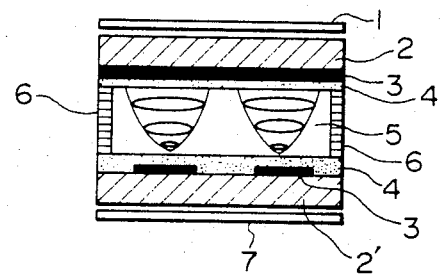
FIG. 1($a$) is a cross-sectional view of a conventional TN-FEM type liquid crystal cell.
Figure 1B:
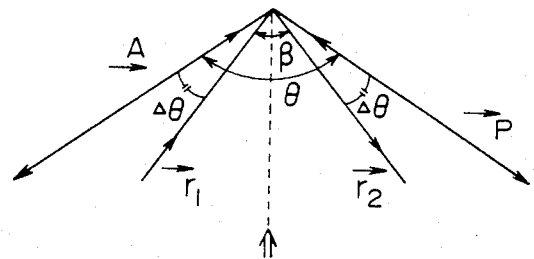

A TN-FEM type liquid crystal cell, as shown in FIG. 1, was employed which includes a liquid crystal layer having a thickness d of 5.5 $\mu$m. The liquid crystal material used was PCH. The anisotropy $\Delta n$ was 0.1, and, thus, the product $\Delta n \cdot d$ was 0.55 $\mu$m.

Figure 4:
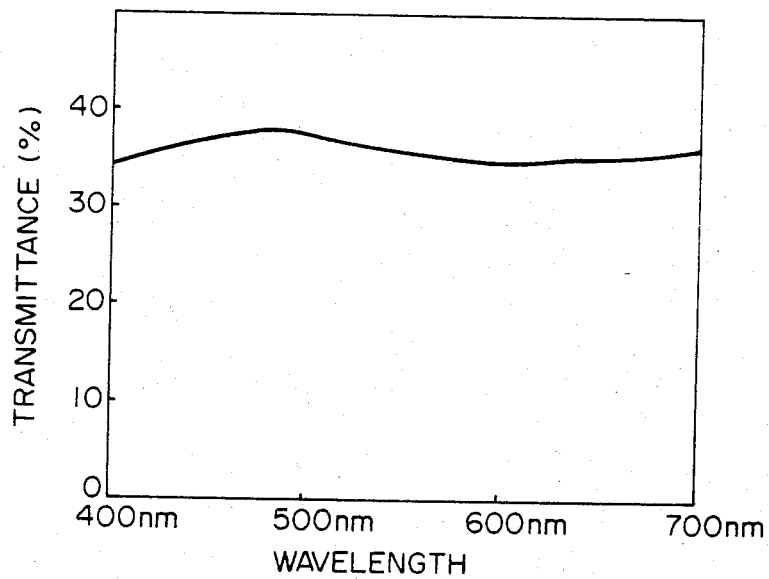
FIG. 4 is a graph of spectral characteristics of a polarizer and an analyzer according to a first embodiment of the present invention.
Figure 5:
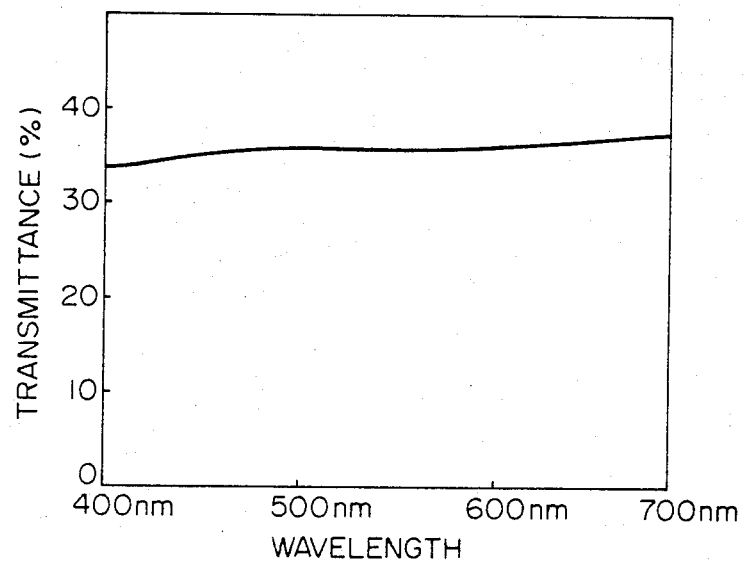
FIG. 5 is a graph of spectral characteristics of a polarizer and an analyzer according to the prior art.
Figure 6:
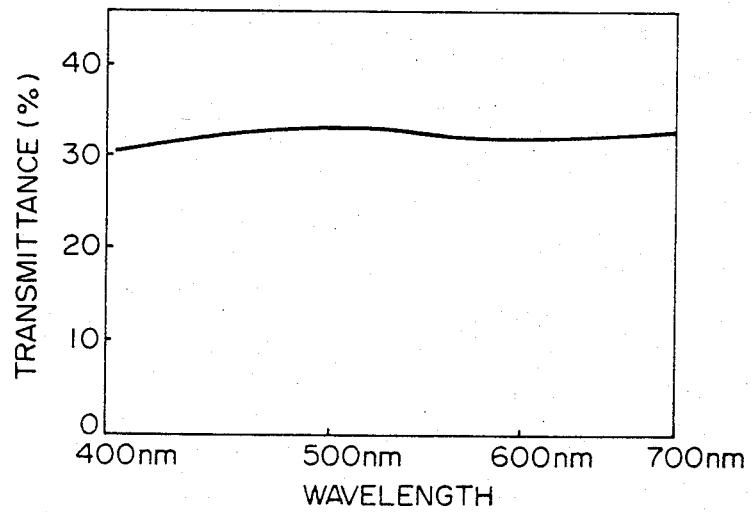
FIG. 6 is a graph of spectral characteristics of light transmitted through a TN-FEM type liquid crystal cell having polarization axes forming an angle of 92° therebetween.
Figure 7:
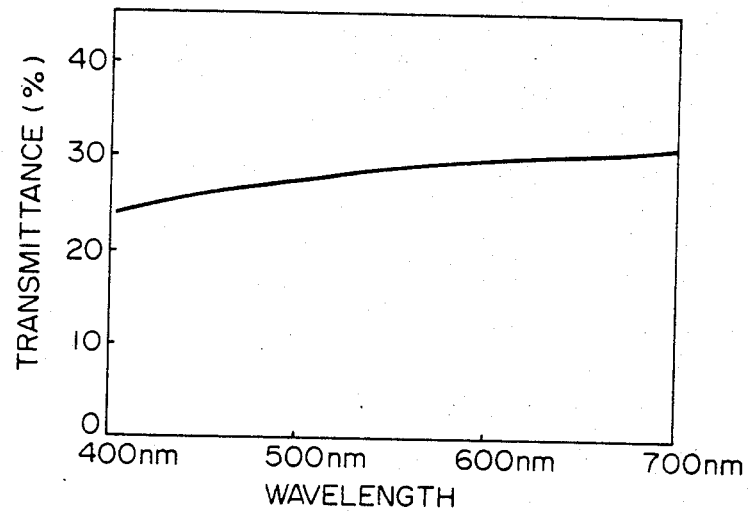
FIG. 7 is a graph of spectral characteristics of the polarizer and the analyzer described with reference to FIG. 5, which have polarization axes forming an angle of 90° therebetween.

FIG. 4 illustrates spectral characteristics of a polarizer and an analyzer according to this example, which have a maximum transmittance in the vicinity of the wavelength 450 nm. FIG. 5 shows spectral characteristics of a polarizer and an analyzer according to the prior art, which are flat throughout the full visible range. FIG. 6 shows spectral characteristics of light transmitted though a TN-FEM type liquid crystal dispaly using the polarizer and the analyzer having a maximum transmittance in the vicinity of the wavelength 450 nm, as shown in FIG. 4, and having polarization axes forming an angle of 92° therebetween. FIG. 6 shows that the spectral characteristics are flat throughtout the entire visible light range. For comparison, FIG. 7 shows spectral characteristics of light transmitted through a TN-FEM type liquid display using the polarizer and the analyzer having the conventional spectral characteristics illustrated in FIG. 5, and having polarization axes forming an angle of 90° therebetween. Since the transmittance is higher at longer wavelengths in the visible light range, the display surface of the liquid crystal cell is rendered reddish. The advantages of the present invention are evident from the comparison between FIGS. 6 and 7.

EXAMPLE 2

A TN-FEM type liquid crystal cell, as shown in FIG. 1, was used which includes a liquid crystal layer having a thickness d of 6.8 $\mu$m. The liquid crystal material used was mixture of PCH, biphenyl and ester. The refractive index anisotropy n was 0.16, and, thus, the product $\Delta n \cdot d$ was 1.09.

Figure 8:
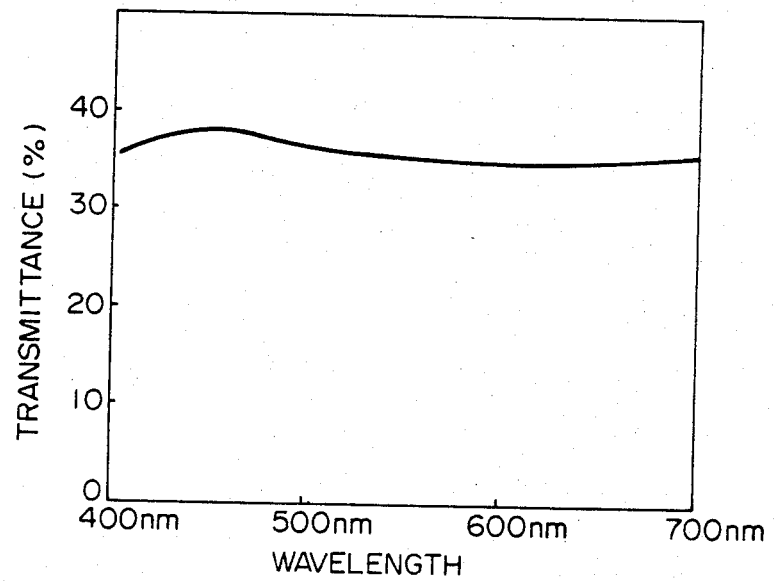
FIG. 8 is a graph of spectral characteristics of a polarizer and an analyzer according to a second embodiment of the present invention.
Figure 9:
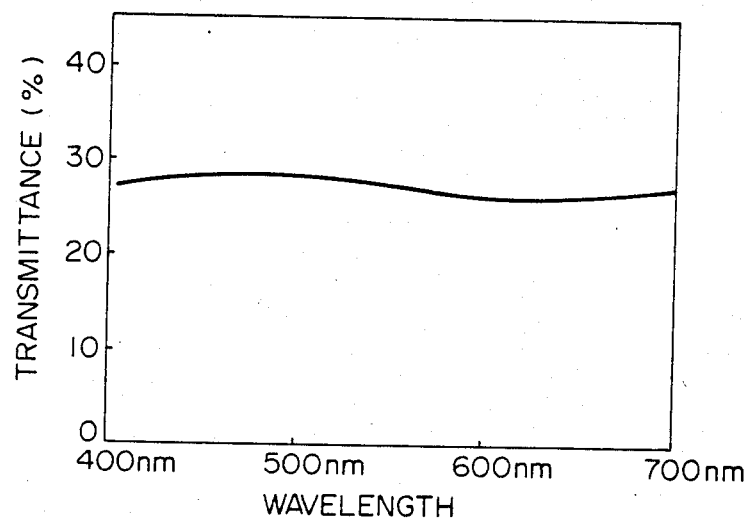
FIG. 9 is a graph of spectral characteristics of light transmitted through a TN-FEM type liquid crystal cell having polarization axes forming an angle of 94° therebetween.
Figure 10:
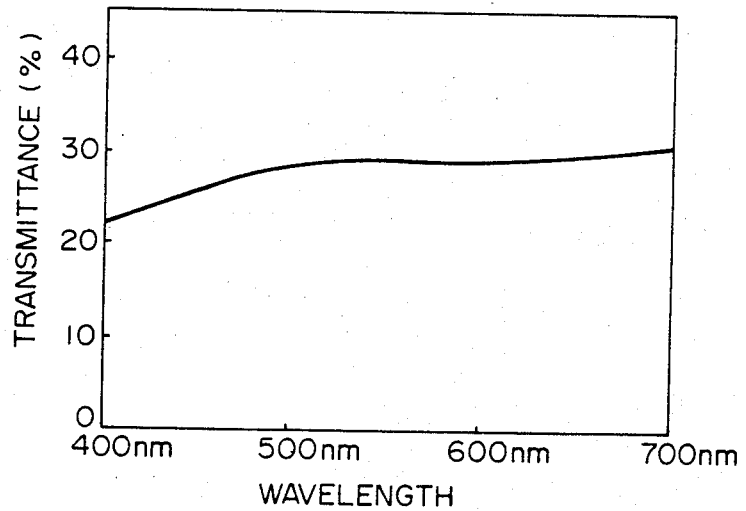
FIG. 10 is a graph of spectral characteristics of the polarizer and the analyzer described with reference to FIG. 5, which have polarization axes forming an angle of 90° therebetween.

FIG. 8 illustrates spectral characteristics of a polarizer and an analyzer according to this example, which have a maximum transmittance in the vicinity of the wavelengths 450 nm. FIG. 9 shows spectral characteristics of light transmitted through a TN-FEM type liquid crystal display using the polarizer and the analyzer having the spectral characteristics as shown in FIG. 8 and polarization axes forming an angle of 94° therebetween. FIG. 9 shows that the spectral characteristics are flat throughout the entire visible light range as with Example 1. For comparison, FIG. 10 shows spectral characteristics of light transmitted through a TN-FEM type liquid crystal display using the polarizer and the analyzer having the conventional spectral characteristics, as shown in FIG. 5, and haivng polarization axes forming an angle of 90° therebetween.

Example 2 indicates that the display quality of the liquid crystal cell is improved by using the polarizer and analyzer having a maximum transmittance at shorter wavelengths in the visible light range.

As described above, the present invention eliminates a coloring phenomenon of a liquid crystal display cell through the control of spectral characteristics of a polarizer and an analyzer, and allows the production of liquid crystal displays of improved display quality.

What is claimed is:

1. A liquid crystal display, comprising;
   a polarizer having a first polarization axis;
   an analyzer having a second polarization axis, the first and second polarization axes forming an angle therebetween; and
   a liquid crystal layer, mounted between said polarizer and said analyzer, having a refractive index anisotropy and thickness, such that when the product of the refractive index anisotropy and thickness is approximately 0.5 $\mu$m, the angle is selected in the range from 92 and 110 degrees, so that a combined light transmittance of said polarizer and said analyzer is a maximum in the wavelength range from 400 nm to 500 nm.

2. A liquid crystal display as recited in claim 1, wherein said liquid crystal layer comprises PCH.

3. A liquid crystal display as recited in claim 2, wherein said liquid crystal layer has a twisted nematic structure.

4. A liquid crystal display, comprising;
   a polarizer having a first polarization axis;
   an analyzer having a second polarization axis, the first and second polarization axes forming an angle therebetween; and
   a liquid crystal layer, mounted between said polarizer and said analyzer, having a refractive index anisotropy and a thickness, such that when the product of the refractive index anisotropy and thickness is approximately 1.0 $\mu$m, the angle is selected in the range from 94 to 120 degrees, so that a combined light transmittance of said polarizer and said analyzer is a maximum in the wavelength range from 400 nm to 500 nm.

5. A liquid crsytal display as recited in claim 4, wherein said liquid crystal layer comprises a mixture of PCH, biphenyl and ester.

6. A liquid crystal display as recited in claim 5, wherein said liquid crystal layer has a twisted nematic structure.

7. A liquid crystal display, comprising:
liquid crystal layer means for transmitting visible light, having a varying transmittance characteristic dependent upon a frequency of the light transmitted and a product of a refractive index anisotropy and a thickness; and
means, mounted adjacent said liquid crystal layer and transmitting the visible light, for compensating the varying transmittance characteristic of said liquid crystal layer means and producing a substantially constant transmittance of the visible light, so that the visible light passing through said liquid crystal layer means and said means for compensating is transmitted substantially uniformly at the visible light frequencies, said means for compensating comprising a polarizer and an analyzer having respective polarization axes, and said means for compensating compensates by selecting an angle between the polarization axes in dependence upon the product.

* * * * *

UNITED STATES PATENT AND TRADEMARK OFFICE
CERTIFICATE OF CORRECTION

PATENT NO. : 4,552,436

DATED : November 12, 1985

INVENTOR(S) : SHUICHI KOZAKI ET AL.

It is certified that error appears in the above-identified patent and that said Letters Patent is hereby corrected as shown below:

Col. 3, line 38, after "The" insert --refractive index--.

Signed and Sealed this

Eleventh Day of March 1986

[SEAL]

Attest:

DONALD J. QUIGG

Attesting Officer

Commissioner of Patents and Trademarks